United States Patent
Lee

(10) Patent No.: US 11,584,189 B2
(45) Date of Patent: Feb. 21, 2023

(54) BUSH FOR VEHICLES AND METHOD FOR ASSEMBLING THE SAME

(71) Applicants: Hyundai Motor Company, Seoul (KR); Kia Corporation, Seoul (KR)

(72) Inventor: Sang Min Lee, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 45 days.

(21) Appl. No.: 17/322,734

(22) Filed: May 17, 2021

(65) Prior Publication Data

US 2022/0080800 A1   Mar. 17, 2022

(30) Foreign Application Priority Data

Sep. 14, 2020   (KR) .................. 10-2020-0117424

(51) Int. Cl.
| | | |
|---|---|---|
| *B60G 21/055* | (2006.01) | |
| *B60G 7/04* | (2006.01) | |
| *B62D 1/19* | (2006.01) | |

(52) U.S. Cl.
CPC ...... *B60G 21/0551* (2013.01); *B60G 2204/41* (2013.01); *B60G 2204/418* (2013.01); *B60G 2206/81012* (2013.01)

(58) Field of Classification Search
CPC ........ B62D 1/19; B60G 7/04; B60G 21/0551; B60G 2204/122; B60G 2204/1222; B60G 2204/41; B60G 2204/418; B60G 2206/427; B60G 2206/8101; B60G 2206/81012; B60G 2206/821
See application file for complete search history.

(56) References Cited

U.S. PATENT DOCUMENTS

| 5,013,166 A | * | 5/1991 | Domer | B60G 21/0551 |
| | | | | 384/220 |
| 2004/0075235 A1 | * | 4/2004 | Cai | B60G 21/0551 |
| | | | | 280/124.152 |
| 2016/0001627 A1 | * | 1/2016 | Kobayashi | B60G 21/0551 |
| | | | | 248/596 |

FOREIGN PATENT DOCUMENTS

| CN | 108099538 | * | 6/2018 | |
| DE | 102016112203 | * | 1/2017 | |
| FR | 2710381 A1 | * | 3/1995 | ......... B60G 21/0551 |
| JP | 3338189 B2 | * | 10/2002 | |
| KR | 20110023274 A | * | 3/2011 | |

(Continued)

OTHER PUBLICATIONS

Description Translation for (KR 2012015195) from Espacenet (Year: 2012).*

(Continued)

*Primary Examiner* — Karen Beck
*Assistant Examiner* — Daniel M. Keck
(74) *Attorney, Agent, or Firm* — Morgan, Lewis & Bockius LLP

(57) ABSTRACT

A bush for vehicles and a method for assembling the same, may include an elastic body closely attached to an external surface of an internal structure, a bearing configured such that the elastic body is coupled to an internal surface of the bearing, a housing coupled to an external surface of the bearing to come into sliding contact with the bearing and mounted on a target object on which the housing is to be mounted, and seals mounted between both end portions of the bearing and both end portions of the housing to seal a sliding contact surface between the bearing and the housing.

19 Claims, 11 Drawing Sheets

(56) References Cited

FOREIGN PATENT DOCUMENTS

| KR | 20110132744 | * | 12/2011 |
| KR | 10-2012-0015195 A | | 2/2012 |
| KR | 10-1791555 B1 | | 10/2017 |
| KR | 10-2020-0065213 A | | 6/2020 |
| KR | 10-2020-0111852 A | | 10/2020 |

OTHER PUBLICATIONS

Description Translation for (FR 2710381) from Espacenet (Year: 1995).*
Description Translation for (KR 20200111852) from Espacenet (Year: 2020).*
Description Translation for (DE 102016112203) from Espacenet (Year: 2017).*

* cited by examiner

FIG. 5A
FIG. 5B
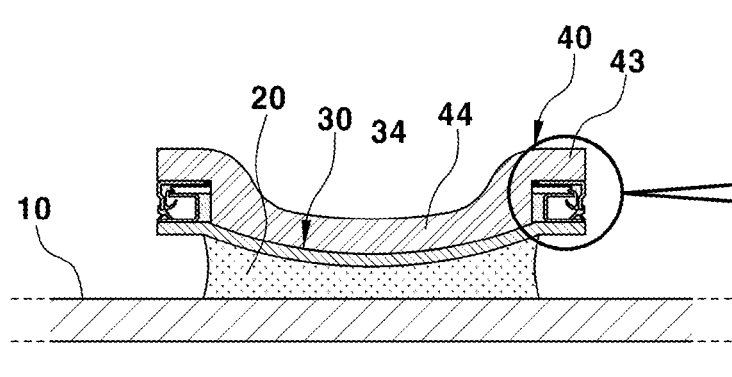
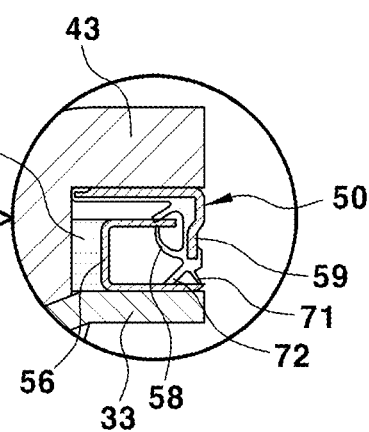
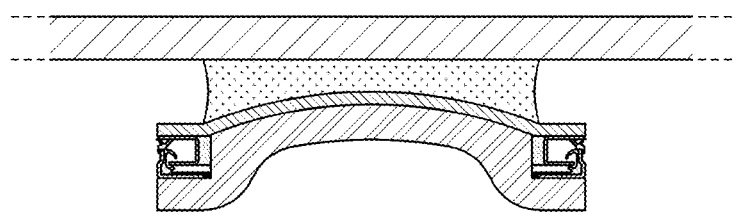

BUSH FOR VEHICLES AND METHOD FOR ASSEMBLING THE SAME

CROSS-REFERENCE TO RELATED APPLICATION

The present application claims priority to Korean Patent Application No. 10-2020-0117424 filed on Sep. 14, 2020, the entire contents of which is incorporated herein for all purposes by this reference.

BACKGROUND OF THE INVENTION

Field of the Invention

The present invention relates to a bush for vehicles and a method for assembling the same. More particularly, it relates to a bush for vehicles, which is used to mount various internal structures on a vehicle body to control the behavior of the vehicle body and to absorb vibration, and a method for assembling the same.

Description of Related Art

In general, various internal structures, such as a stabilizer bar, a cowl cross bar, a steering shaft, a suspension shaft, etc., are mounted on a vehicle body by bushes in a vehicle.

As a conventional bush for mounting the stabilizer bar on the vehicle body, among these internal structures, a bush including a ball bearing or a roller bearing is used.

For example, a conventional bush includes an elastic body formed by injection molding and provided on the external diameter portion of a stabilizer bar, an external housing mounted on a vehicle body, a bearing mounted between the elastic body and the external housing, and seals formed integrally with the elastic body to seal both sides of the bearing.

However, the conventional bush has the following problems.

First, as the external housing and the seals of the elastic body easily moved far away from each other due to the conical behavior of the stabilizer bar, foreign substances easily enter the bearing, thus deteriorating the functions of the seals and the bearing.

Second, the seals are formed integrally with the elastic body, and thus the positions of the seals for hermetically sealing the bearing cannot be freely adjusted and the seals cannot secure the capability thereof to completely seal the bearing.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a bush for vehicles having a novel structure, which may provide freedom in determination of the mounting positions of seals, impart the seals with the capability to completely seal a bearing, and stably secure an operation of an internal structure for controlling the behavior of a vehicle body and an operation of the internal structure for absorbing vibration, and a method for assembling the same.

Various aspects of the present invention are directed to providing a bush for vehicles including an elastic body closely attached to an external surface of an internal structure, a bearing configured such that the elastic body is coupled to an internal surface of the bearing, a housing coupled to an external surface of the bearing to come into sliding contact with the bearing and mounted on a target object on which the housing is to be mounted, and seals mounted on at least one of first and second end portions of the bearing and first and second end portions of the housing to seal a sliding contact surface between the bearing and the housing.

In various exemplary embodiments of the present invention, a first restraint terminal may be formed at a longitudinal center or each of both end portions of the bearing, and a second restraint terminal configured to be closely attached to the first restraint terminal may be formed at a longitudinal center or each of both end portions of the housing, to restrain a longitudinal relative motion between the bearing and the housing.

In another exemplary embodiment of the present invention, the first restraint terminal and the second restraint terminal may have the same cross-sectional shape which is formed to be concave in an inward direction thereof, formed to be convex in an outward direction thereof, or formed to have one or more uneven surfaces or tapered surfaces.

In yet another exemplary embodiment of the present invention, the elastic body may be formed integrally with the internal surface of the bearing by injection molding, or the elastic body may be assembled with the internal surface of the bearing through interference fitting, or be temporarily assembled with the internal surface of the bearing through interference fitting and then be attached thereto using an adhesive.

In yet another exemplary embodiment of the present invention, when the elastic body is manufactured by molding, an insert configured to reinforce stiffness of the elastic body may be placed in the elastic body.

In still yet another exemplary embodiment of the present invention, one or more ribs may protrude from the internal surface of the bearing in a circumferential direction, a longitudinal direction and a diagonal direction of the bearing to reinforce stiffness of the bearing, to guide the elastic body interference-fitted into the bearing and to regulate a position of the elastic body.

In a further exemplary embodiment of the present invention, a lubricant storage hole or a lubricant storage groove may be formed at a predetermined position of the bearing.

In another further exemplary embodiment of the present invention, first seal mounting terminals may extend from both end portions of the bearing, and second seal mounting terminals may extend from both end portions of the housing, to mount the seals therein.

In yet another further exemplary embodiment of the present invention, the seal may include a body portion configured such that the first seal mounting terminal of the bearing is pressed into an internal surface of the body portion, a first rib including an external rib and an internal rib extending from an internal end portion of an external diameter of the body portion and spreading at a designated angle therebetween to be closely attached to the second seal mounting terminal, and a second rib extending from an internal end portion of an internal diameter of the body portion in a horizontal direction to be closely attached to an external surface of the elastic body.

In yet another further exemplary embodiment of the present invention, the seal may include a body portion configured such that the second seal mounting terminal of the housing is pressed into an internal surface of the body portion, and a single rib including a subsidiary rib extending from an internal end portion of an internal diameter of the body portion to be closely attached to the first seal mounting terminal of the bearing.

In still yet another further exemplary embodiment of the present invention, the seal may include a body portion configured such that the first seal mounting terminal of the bearing is pressed into an internal surface of the body portion, and a single rib including a subsidiary rib extending from an internal end portion of an external diameter of the body portion to be closely attached to the second seal mounting terminal of the housing.

In a still further exemplary embodiment of the present invention, the seal may include a first body portion configured to have a C-shaped cross section and including a contact rib to be pressed into a space between the first seal mounting terminal of the bearing and the second seal mounting terminal of the housing, and a second body portion configured to have an L-shaped cross-section and including a coupling rib formed on an internal surface thereof such that the first body portion is pressed into the coupling rib.

In a yet still further exemplary embodiment of the present invention, the bearing may include a first bearing portion and a second bearing portion, configured to be closely coupled to each other to form a spherical cross-section together with the elastic body, and the housing may include an upper housing portion and a lower housing portion, configured to be coupled to each other to surround the first bearing portion and the second bearing portion.

In another further exemplary embodiment of the present invention, position regulatory pins and position regulatory recesses may be formed on and in the first bearing portion and the second bearing portion to assemble the first bearing portion and the second bearing portion with each other.

In yet another further exemplary embodiment of the present invention, parting lines between the first bearing portion and the second bearing portion may be spaced from parting lines between the upper housing portion and the lower housing portion by a predetermined angle.

In yet another further exemplary embodiment of the present invention, a lubricant injection hole may be formed in an external surface of the upper housing portion and the lower housing portion, or lubricant storage grooves may be formed in internal surfaces of the upper housing portion and the lower housing portion, which contact with the bearing, and mounting terminals configured to be mounted on the target object on which the housing is to be mounted are formed at the upper housing portion and the lower housing portion.

In still yet another further exemplary embodiment of the present invention, the elastic body may include a first elastic body portion and a second elastic body portion configured to be formed integrally with internal surfaces of the first bearing portion and the second bearing portion, respectively, by injection molding, or to be separately attached to or pressed into the internal surfaces of the first bearing portion and the second bearing portion, or be manufactured in a one-piece structure having one parting line and attached to or pressed into the internal surfaces of the first bearing portion and the second bearing portion.

Various aspects of the present invention are directed to providing a method for assembling a bush for vehicles, the method including separately manufacturing a first bearing portion and a second bearing portion configured to be assembled with each other to form a bearing, separately manufacturing an upper housing portion and a lower housing portion configured to be assembled with each other to form a housing, forming a first elastic body portion and a second elastic body portion integrally with internal surfaces of the first bearing portion and the second bearing portion by injection molding or attaching the first elastic body portion and the second elastic body portion to the internal surfaces of the first bearing portion and the second bearing portion using an adhesive, inserting a pair of seals into an internal structure to be spaced from each other, closely attaching the first elastic body portion and the second elastic body portion to an external surface of the internal structure, closely coupling the upper housing portion and the lower housing portion to external surfaces of the first bearing portion and the second bearing portion, and assembling the upper housing portion and the lower housing portion, coupled to the external surfaces of the first bearing portion and the second bearing portion, with a vehicle body, mounting the seals between both end portions of the bearing and both end portions of the housing to seal a sliding contact surface between the bearing and the housing, and independently mounting the seals in first seal mounting terminals of the bearing or second seal mounting terminals of the housing or by independently pressing the seals into spaces between the first seal mounting terminals and the second seal mounting terminals to seal the sliding contact surface between the bearing and the housing.

Various aspects of the present invention are directed to providing a method for assembling a bush for vehicles, the method including separately manufacturing a first bearing portion and a second bearing portion configured to be assembled with each other to form a bearing, separately manufacturing an upper housing portion and a lower housing portion configured to be assembled with each other to form a housing, forming a first elastic body portion and a second elastic body portion integrally with internal surfaces of the first bearing portion and the second bearing portion by injection molding or attaching the first elastic body portion and the second elastic body portion to the internal surfaces of the first bearing portion and the second bearing portion using an adhesive, inserting a pair of seals into an internal structure to be spaced from each other, closely attaching the first elastic body portion and the second elastic body portion to an external circumferential surface of the internal structure, pressing external surfaces of the first bearing portion and the second bearing portion by holding jigs, and mounting the seals configured to seal a sliding contact surface between the bearing and the housing in first seal mounting terminals of the bearing, and removing the holding jigs, closely attaching the upper housing portion and the lower housing portion to external surfaces of the first bearing portion and the second bearing portion, and then assembling the upper housing portion and the lower housing portion, closely attached to the external surfaces of the first bearing portion and the second bearing portion, with a vehicle body.

In the closely coupling the upper housing portion and the lower housing portion to the external surfaces of the first bearing portion and the second bearing portion, parting lines between the upper housing portion and the lower housing portion may be spaced from parting lines between the first bearing portion and the second bearing portion by a predetermined angle.

In the attaching the first elastic body portion and the second elastic body portion to the internal surfaces of the first bearing portion and the second bearing portion using the adhesive, a process of curing the adhesive may be further performed.

Other aspects and exemplary embodiments of the invention are discussed infra.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2A, FIG. 2B, FIG. 3A, FIG. 3B, FIG. 4A, FIG. 4B, FIG. 5A and FIG. 5B are cross-sectional views exemplarily illustrating the assembled state of the bush for vehicles according to various exemplary embodiments of the present invention;

Figure 1:
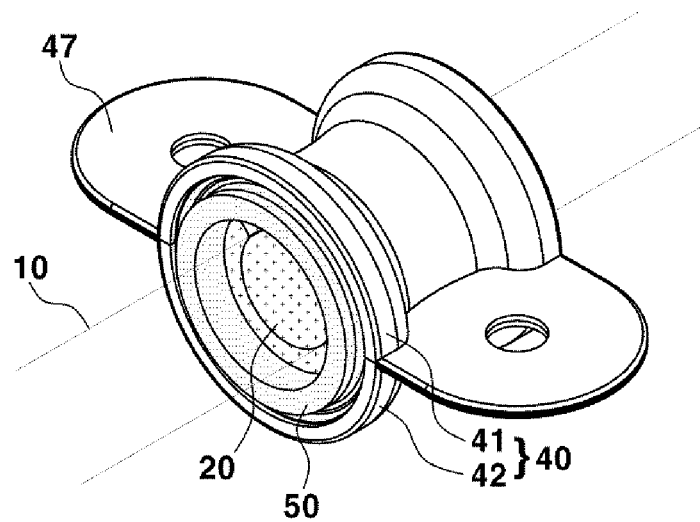
FIG. 1 is a perspective view exemplarily illustrating the external appearance of a bush for vehicles according to various exemplary embodiments of the present invention.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will be made in detail to various embodiments of the present invention, examples of which are illustrated in the accompanying drawings and described below. While the present invention will be described in conjunction with exemplary embodiments of the present invention, it will be understood that the present description is not intended to limit the present invention to the exemplary embodiments. On the other hand, the present invention is directed to cover not only the exemplary embodiments of the present invention, but also various alternatives, modifications, equivalents and other embodiments, which may be within the spirit and scope of the present invention as defined by the appended claims.

Figure 2A:
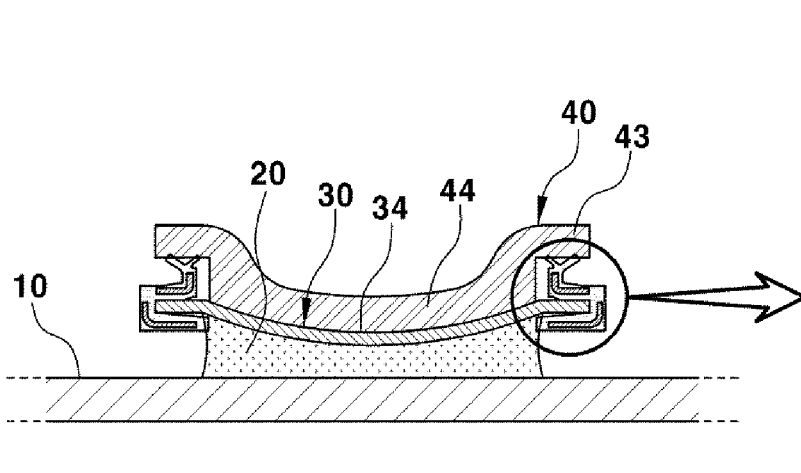
Figure 2B:
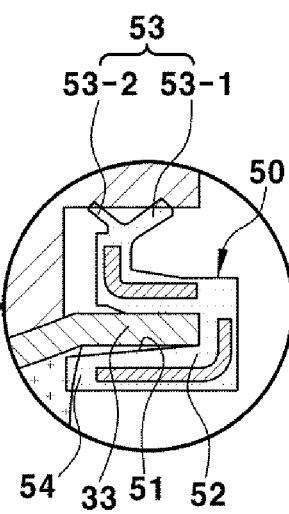
Figure 2B:
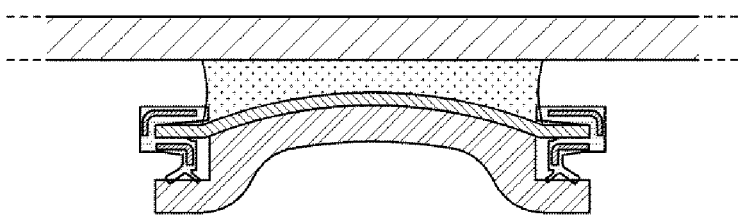

FIG. 1, FIG. 2A and FIG. 2B illustrate the state in which a bush for vehicles according to various exemplary embodiments of the present invention is assembled with an internal structure.

The internal structure 10 shown in FIG. 1, FIG. 2A and FIG. 2B refers to one of various pipe-shaped parts, into which driving vibrations and loads are input, such as a stabilizer bar, a cowl cross bar, a steering shaft, a suspension shaft, etc., and hereinafter, to aid in understanding of the present invention, a stabilizer bar applied as the internal structure 10 will be exemplarily described.

Referring to FIG. 2A and FIG. 2B, an elastic body 20 is closely attached to the external circumferential surface of the internal structure 10, and the elastic body 20 is displaced during the rotational motion and the conical motion of the internal structure 10 and is configured to absorb vibration.

A bearing 30 is joined to the external surface of the elastic body 20.

That is to say, the elastic body 20 is joined to the internal surface of the bearing 30.

For example, the elastic body 20 may be formed integrally with the internal surface of the bearing 30 by injection molding.

Alternatively, the elastic body 20, which is manufactured separately, may be temporarily assembled with the internal surface of the bearing 30 through interference fitting, be delivered, and then be attached to the internal surface of the bearing 30 using an adhesive.

Figure 9:
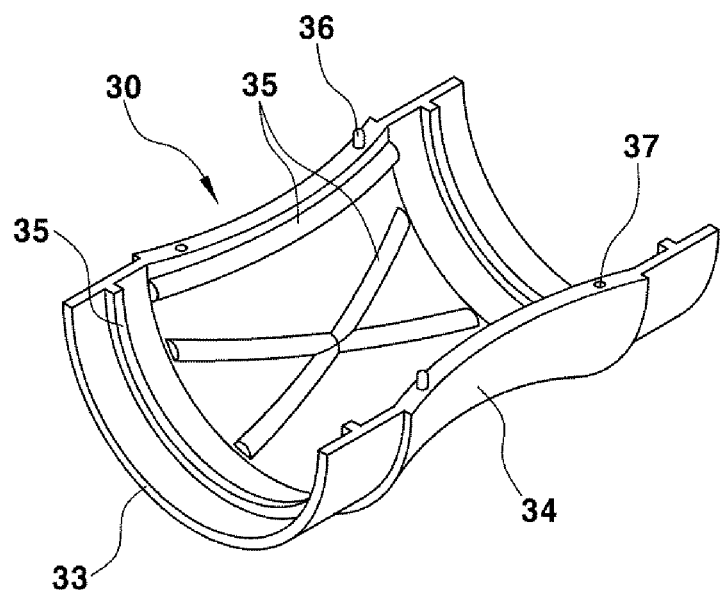
FIG. 9 is a perspective view exemplarily illustrating the structure of a bearing of the bush for vehicles according to various exemplary embodiments of the present invention.

For the present purpose, as shown in FIG. 9, one or more ribs 35 protrude from the internal surface of the bearing 30 in the circumferential direction thereof, the longitudinal direction and the diagonal direction of the bearing 30 to reinforce stiffness of the bearing 30, to guide the elastic body 20 interference-fitted into the bearing 30 and to regulate the position of the elastic body 20.

Figure 10:
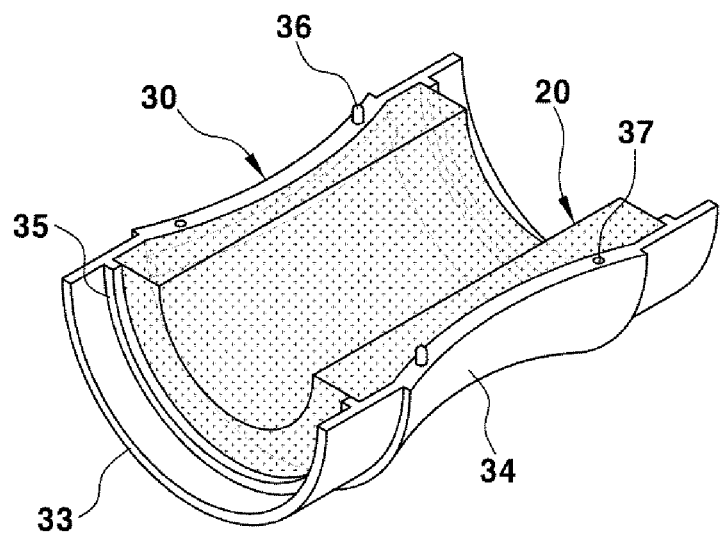
FIG. 10 is a perspective view exemplarily illustrating the state in which an elastic body is temporarily assembled with the bearing of the bush for vehicles according to various exemplary embodiments of the present invention.

Therefore, as shown in FIG. 10, when the elastic body 20 is temporarily assembled with the internal surface of the bearing 30 through interference fitting, the ribs 35 formed in the circumferential direction of the bearing 30 regulate the movement of the elastic body 20 in the longitudinal direction thereof, and the ribs 35 formed in the longitudinal direction of the bearing 30 regulate the movement of the elastic body 20 in the circumferential direction thereof.

Figure 11:
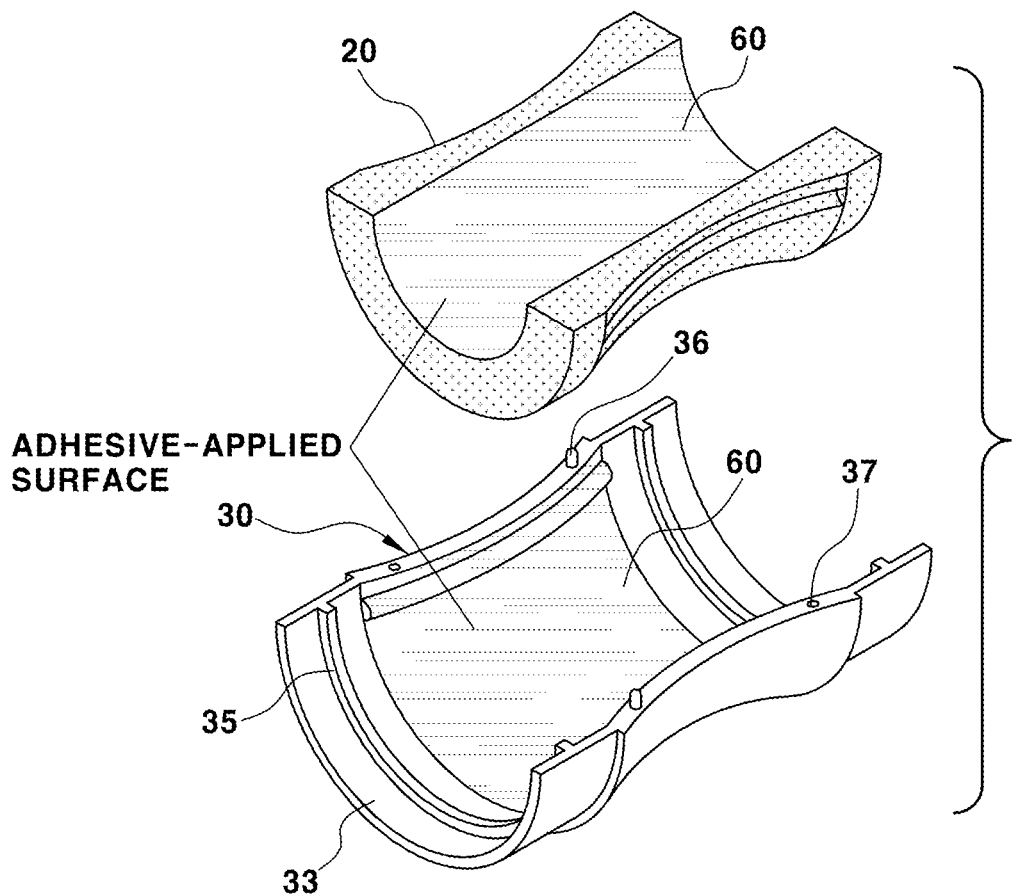
FIG. 11 is a perspective view exemplarily illustrating an example in which the elastic body is attached to the bearing of the bush for vehicles according to various exemplary embodiments of the present invention using an adhesive.

Thereafter, during a process of assembling the bush according to various exemplary embodiments of the present invention, the elastic body 20 may be integrally joined to the internal surface of the bearing 30 by applying an adhesive 60 to the internal surface of the bearing 30, as shown in FIG. 11.

Here, the adhesive 60 may be selectively applied to the internal surface of the elastic body 20 to be joined to the internal structure 10.

A housing 40, which is mounted on a vehicle body, is mounted on the external surface of the bearing 30 to come into sliding contact with the bearing 30.

The housing 40 may be manufactured in one of various shapes depending on the specifications of the bush and the structure of the vehicle body, and the housing 40 may include an upper housing portion 41 and a lower housing portion 42 to realize ease in assembly of the housing 40 with the bearing 30.

Figure 14:
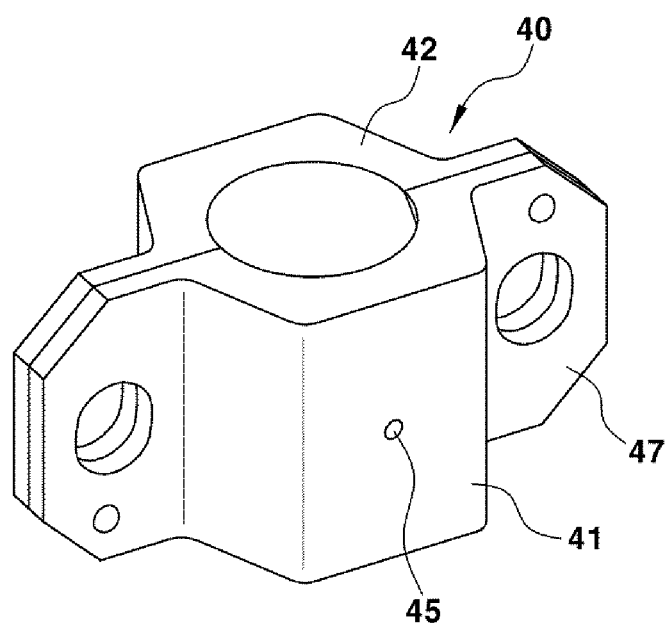
FIG. 14, and FIG. 15 are perspective views exemplarily illustrating one example of a housing of the bush for vehicles according to various exemplary embodiments of the present invention.
Figure 15:
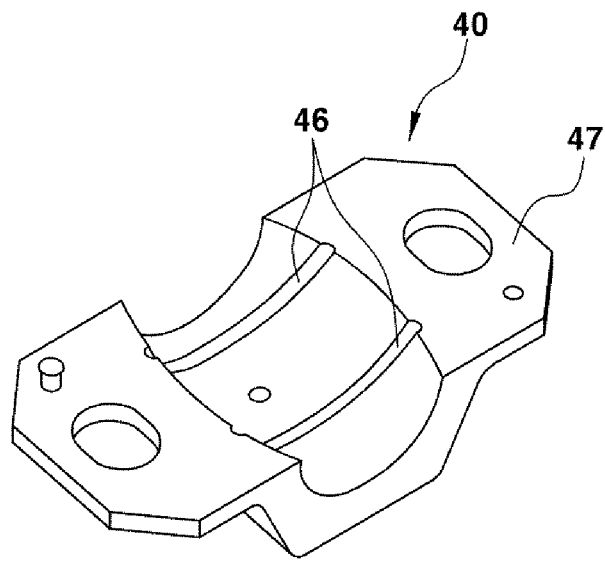

A lubricant injection hole 45 configured to inject a lubricant into the inside of the housing 40, in which the bearing 30 is present, may be formed in the external surface of the upper housing portion 41 or the lower housing portion 42, as shown in FIG. 14, or lubricant storage grooves 46 configured to store the lubricant may be formed in the internal surfaces of the upper housing portion 41 and the lower housing portion 42, which contact with the bearing 30, and vehicle body-mounting terminals 47 for assembly with the vehicle body may be formed at both end portions of the upper housing portion 41 and the lower housing portion 42, as shown in FIG. 15.

In the coupling structure between the bearing 30 and the housing 40, to restrain the longitudinal relative motion between the bearing 30 and the housing 40, a first restraint terminal 34 is formed at the longitudinal center of the bearing 30, and a second restraint terminal 44, which comes into sliding contact with the first restraint terminal 34, is formed at the longitudinal center of the housing 20, as shown in FIGS. 2A and 2B.

The first restraint terminal 34 and the second restraint terminal 44 may have the same cross-sectional shape to come into sliding contact with each other.

For example, the first restraint terminal 34 and the second restraint terminal 44 are formed to be concave in the inward direction thereof, formed to be convex in the outward direction thereof, or formed to have a V-shaped tapered surface.

Therefore, when the bearing 30 and the housing 40 come into sliding contact with each other and move relative to each other, the first restraint terminal 34 and the second restraint terminal 44 may prevent detachment of the housing 40 in the longitudinal direction thereof.

Seals 50 configured to seal a sliding contact surface between the bearing 30 and the housing 40 are mounted between both end portions of the bearing 30 and both end portions of the housing 40.

For the present purpose, as shown in FIG. 2A, FIG. 2B, FIG. 3A, FIG. 3B, FIG. 4A, FIG. 4B, FIG. 5A and FIG. 5B, a first seal mounting terminal 33, which is disposed parallel to the internal structure 10, extends from each of both end portions of the bearing 30, and a second seal mounting terminal 43, which is disposed parallel to the internal structure 10, extends from each of both end portions of the housing 40.

The seal 50 may include, as shown in FIGS. 2A and 2B, a body portion 52 configured such that the first seal mounting terminal 33 of the bearing 30 is pressed into the internal surface of a coupling groove 51, a first rib 53 including an external rib 53-1 and an internal rib 53-2 which extend from the internal end portion of the external diameter of the body portion 52 and spread at a designated angle therebetween to be closely attached to the second seal mounting terminal 43, and a second rib 54 which extends from the internal end portion of the internal diameter of the body portion 52 in the horizontal direction to be closely attached to the external surface of the elastic body 20.

Figure 3A:
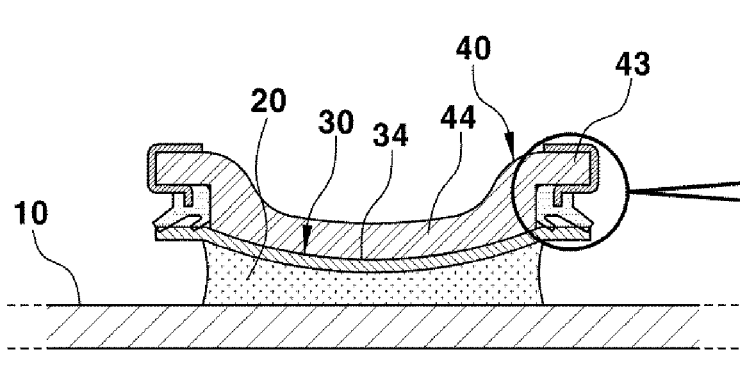
Figure 3B:
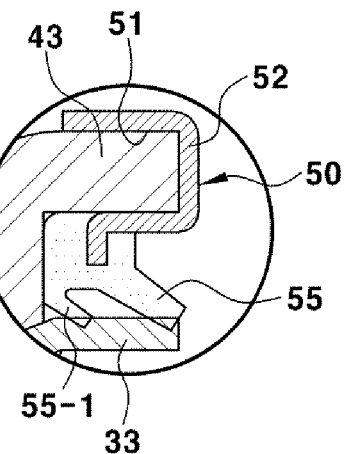

Alternatively, the seal 50 may include, as shown in FIG. 3A and FIG. 3B, a body portion 52 configured such that the second seal mounting terminal 43 of the housing 40 is pressed into the internal surface of a coupling groove 51, and a single rib 55 including a subsidiary rib 55-1 which extends from the internal end portion of the internal diameter of the body portion 52 to be closely attached to the first seal mounting terminal 33 of the bearing 30.

Figure 4A:
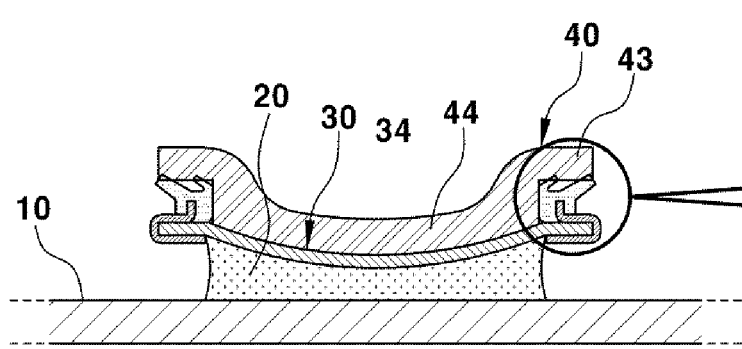
Figure 4B:
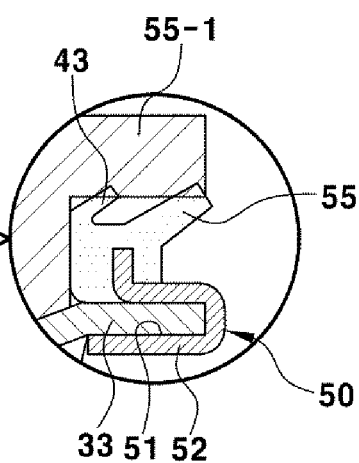
Figure 6A:
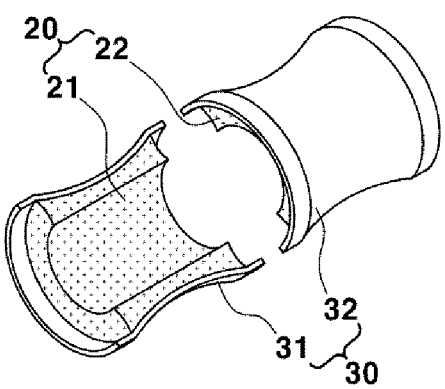
FIG. 6A, FIG. 6B, FIG. 6C, and FIG. 6D are views exemplarily illustrating a method for assembling a bush for vehicles according to various exemplary embodiments of the present invention.
Figure 6B:
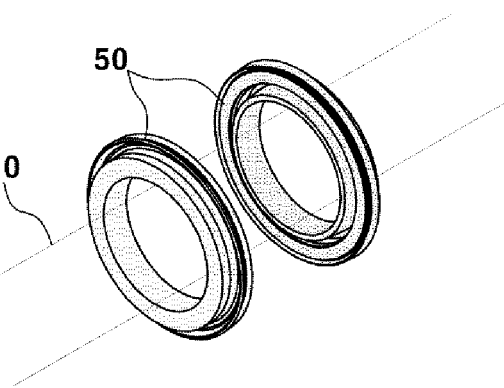
Figure 6D:
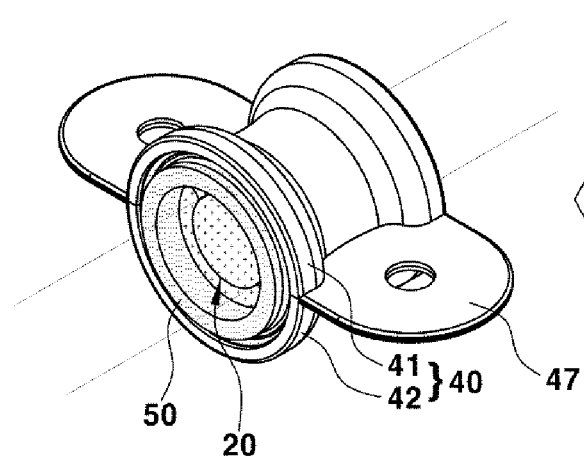
Figure 6C:
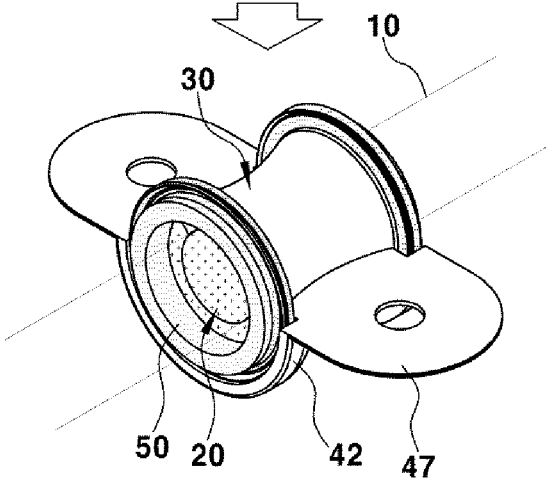
Figure 7A:
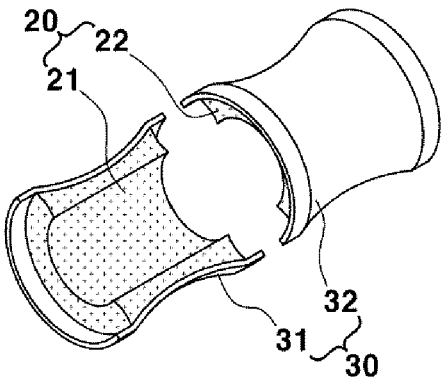
FIG. 7A, FIG. 7B, FIG. 7C, and FIG. 7D are views exemplarily illustrating a method for assembling a bush for vehicles according to various exemplary embodiments of the present invention.
Figure 7B:
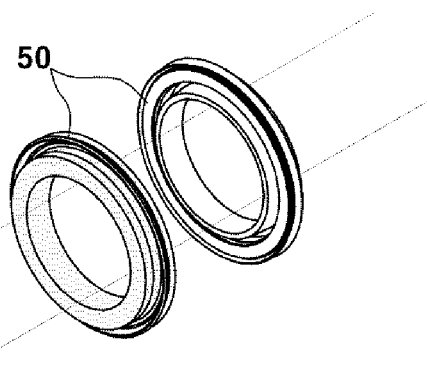
Figure 7D:
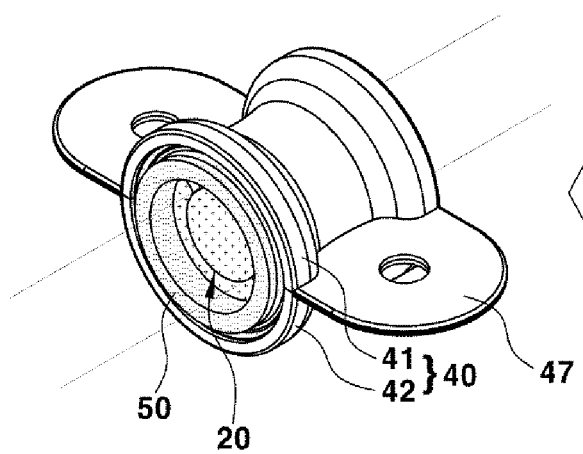
Figure 7C:
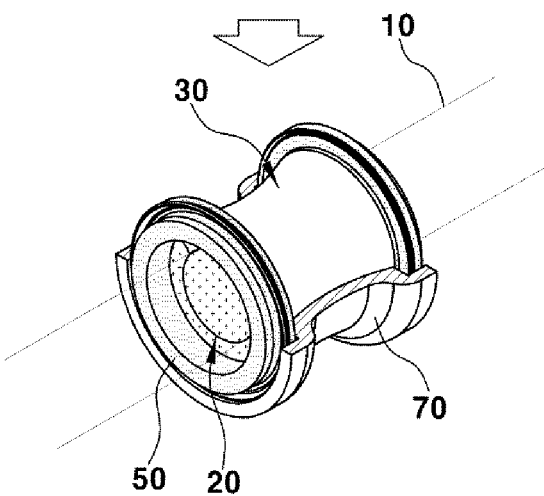
Figure 8:
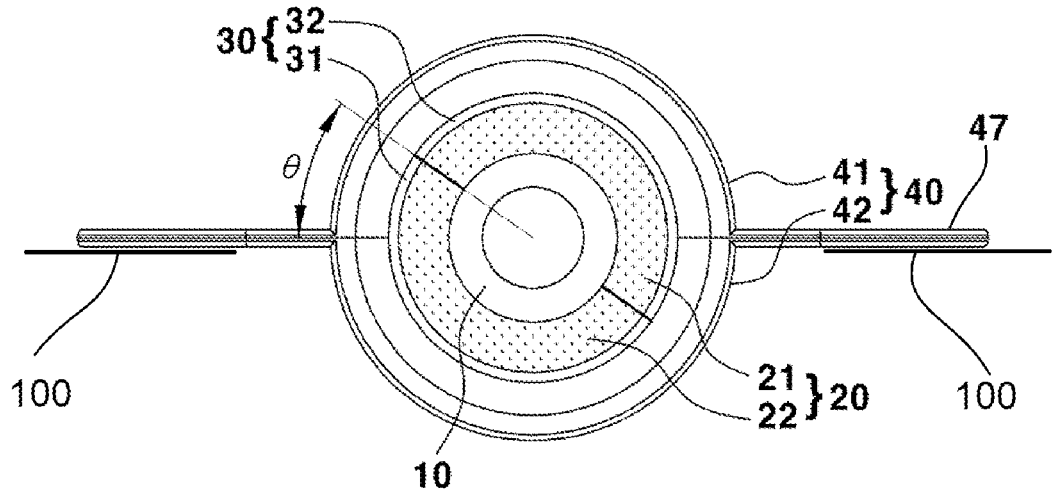
FIG. 8 is a longitudinal-sectional view exemplarily illustrating the assembled state of the bush for vehicles according to various exemplary embodiments of the present invention.

Alternatively, the seal 50 may include, as shown in FIG. 4A and FIG. 4B, a body portion 52 configured such that the first seal mounting terminal 33 of the bearing 30 is pressed into the internal surface of a coupling groove 51, and a single rib 55 including a subsidiary rib 55-1 which extends from the internal end portion of the external diameter of the body portion 52 to be closely attached to the second seal mounting terminal 43 of the housing 40.

Alternatively, the seal 50 may include, as shown in FIG. 5A and FIG. 5B, a first body portion 56 having a C-shaped cross section and including a contact rib 57 to be pressed into a space between the first seal mounting terminal 33 of the bearing 30 and the second seal mounting terminal 43 of the housing 40, and a second body portion 59 having an L-shaped cross-section and including a coupling rib 58 formed on the internal surface thereof such that the first body portion 56 is pressed into the coupling rib 58.

In an exemplary embodiment of the present invention, subsidiary ribs 71 and 72 are formed on a lower portion of the coupling rib 58 so that the bottom portion of the first body portion 56 is sealed by the subsidiary ribs 71 and 72.

In the present way, freedom in determination of the mounting positions of the seals 50 for sealing the sliding contact portion of the bearing 30 may be provided, and the capability of the seals 50 to completely seal the sliding contact portion of the bearing 30 may be secured.

That is, since the seals 50 are independently mounted at the first seal mounting terminals 33 of the bearing 30, at the second seal mounting terminals 43 of the housing 40, or between the first seal mounting terminals 33 and the second seal mounting terminals 43, in which sliding contact between the bearing 30 and the housing 40 does not occur, the mounted state of the seals 50 may be securely maintained even when relative sliding contact between the bearing 30 and the housing 40 occurs.

In more detail, the seals 50 are independently mounted at the first seal mounting terminals 33 of the bearing 30 or the second seal mounting terminals 43 of the housing 40, or are independently pressed into spaces between the first seal mounting terminals 33 and the second seal mounting terminals 43, and thus, when relative sliding contact between the bearing 30 and the housing 40 occurs, the seals 50 are rotated with the bearing 30 or the housing 40, being configured for preventing detachment of the seals 50 and securing durability of the seals 50 while maintaining the sealing function of the seals 50.

Furthermore, in the conventional bush, the seals closely attached to the housing are formed integrally with the elastic body, and when the elastic body is displaced, the seals are also displaced and separated from the housing, and thus the seals lose sealing function thereof with respect to the sliding contact portion of the bearing. In contrast, in the bush according to various exemplary embodiments of the present invention, the seals 50 are independently mounted and may thus continuously maintain the sealing function thereof.

Furthermore, a structure for preventing detachment of the seal may be applied to the bush for vehicles according to various exemplary embodiments of the present invention.

Figure 18A:
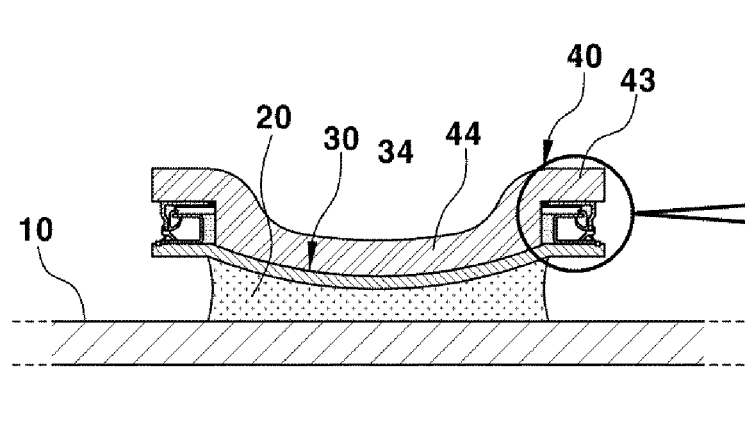
FIG. 18A, FIG. 18B, FIG. 18C and FIG. 18D are cross-sectional views exemplarily illustrating one example of a structure for preventing detachment of a seal of the bush for vehicles according to various exemplary embodiments of the present invention.
Figure 18B:
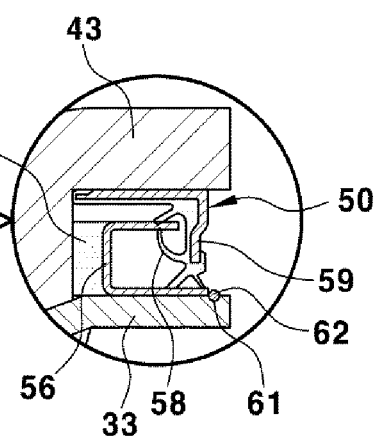
Figure 18B:
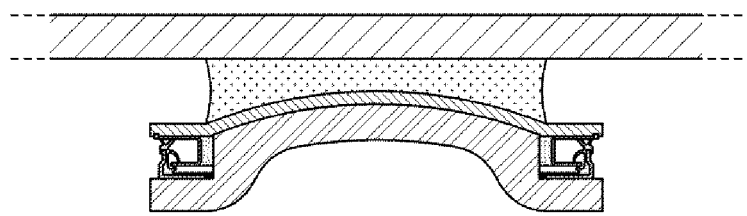

In one example, as shown in FIG. 18A and FIG. 18B, first seal mounting terminals 33 of the bearing 30 extend further outwards, a groove 61 is formed in each of the extensions, and a snap ring 62 configured to restrain the external surface of the seal 50 to prevent detachment of the seal 50 is mounted in the groove 61, being configured for easily preventing detachment of the seal 50.

Figure 18C:
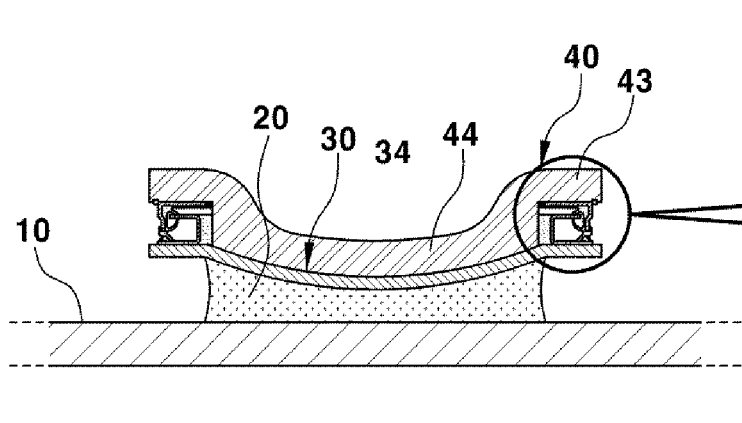
Figure 18D:
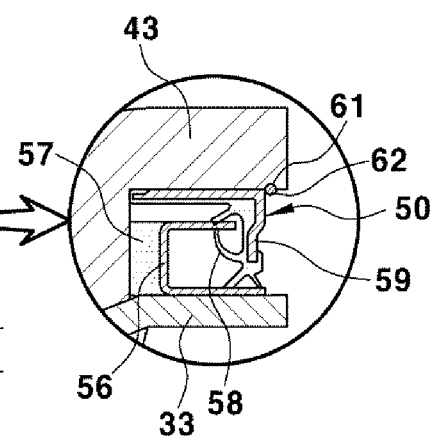

In another example, as shown in FIG. 18C and FIG. 18D, second seal mounting terminals 43 of the housing 40 extend further outwards, a groove 61 is formed in each of the extensions, and a snap ring 62 configured to restrain the external surface of the seal 50 to prevent detachment of the seal 50 is mounted in the groove 61, being configured for easily preventing detachment of the seal 50.

Figure 19A:
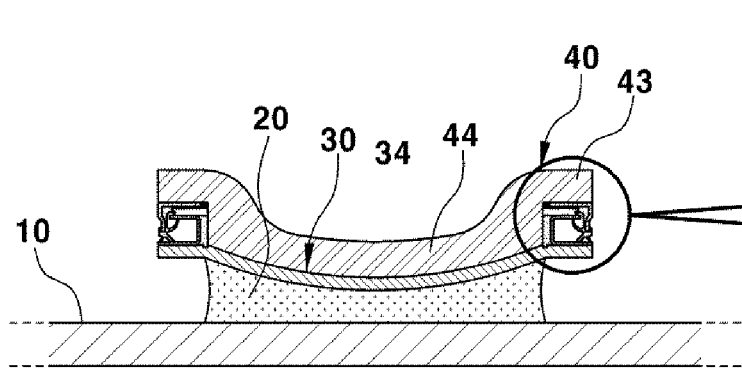
FIG. 19A and FIG. 19B are cross-sectional views exemplarily illustrating another example of the structure for preventing detachment of the seal of the bush for vehicles according to various exemplary embodiments of the present invention.
Figure 19B:
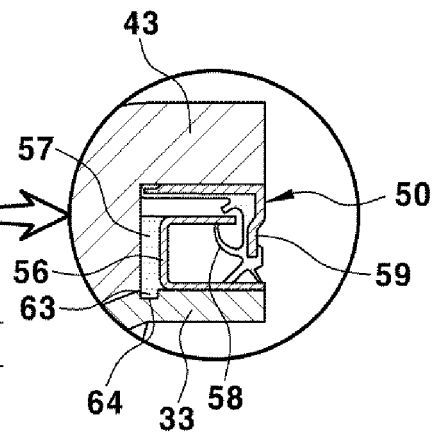

In yet another example, as shown in FIG. 19A and FIG. 19B, a position regulatory stopper 63 protrudes from a predetermined position of the seal 50, a position regulatory recess 64, into which the position regulatory stopper 63 is inserted, is formed in the first seal mounting terminal 33 of the bearing 30 or the second seal mounting terminal 43 of the housing 40, and when the seal 50 is mounted, the position regulatory stopper 63 is inserted into and locked in the position regulatory recess 64, being configured for easily preventing detachment of the seal 50.

Hereinafter, a process of assembling the bush having the above-described configuration according to various exemplary embodiments of the present invention will be described.

FIG. 6A, FIG. 6B, FIG. 6C, and FIG. 6D are views exemplarily illustrating a method for assembling a bush for vehicles according to various exemplary embodiments of the present invention.

As shown in FIG. 6A, FIG. 6B, FIG. 6C, and FIG. 6D, to easily assemble the bush according to various exemplary embodiments of the present invention with the internal structure 10, a first bearing portion 31 and a second bearing portion 32 having a semicircular cross-section configured to form the bearing 30 are separately manufactured, and an upper housing portion 41 and a lower housing portion 42 configured to form the housing 40 are separately manufactured.

Here, the bearing 30 having one integral structure may be manufactured or two or more bearing parts configured to form the bearing 30 may be separately manufactured, and two or more housing parts configured to form the housing 40 may be separately manufactured.

That is to say, the bearing 30 includes the first bearing portion 31 and the second bearing portion 32 which are closely coupled to each other to form a spherical cross-section together with an elastic body 20, and the housing 40 includes the upper housing portion 41 and the lower housing portion 42 which are coupled to each other to surround the first bearing portion 31 and the second bearing portion 32.

Here, as shown in FIG. 9, position regulatory pins 36 and position regulatory recesses 37 are respectively formed on and in the surfaces of the first bearing portion 31 and the second bearing portion 32 which are closely attached to each other, and primary coupling between the first bearing portion 31 and the second bearing portion 32 prior to assembly of the housing 40 therewith may be realized by coupling between the position regulatory pins 36 and the position regulatory recesses 37.

Furthermore, the elastic body 20 may include a first elastic body portion 21 and a second elastic body portion 22 which are respectively formed integrally with the internal surfaces of the first bearing portion 31 and the second bearing portion 32 by injection molding, or the first elastic body portion 21 and the second elastic body portion 22 may be separately manufactured, be temporarily assembled with the internal surfaces of the first bearing portion 31 and the second bearing portion 32 through interference fitting, and then be attached thereto using an adhesive.

Thereafter, a pair of seals 50 is inserted onto the internal structure 10, i.e., a stabilizer bar, to be spaced from each other.

Next, the first elastic body portion 21 and the second elastic body portion 22 are closely attached to the external circumferential surface of the internal structure 10, and accordingly, the first bearing portion 31 and the second bearing portion 32 together with the first and second elastic body portions 21 and 22 form a spherical cross-section.

Subsequently, the upper housing portion 41 and the lower housing portion 42 configured to form the housing 40 are closely attached to the external surfaces of the first bearing portion 31 and the second bearing portion 32, and accordingly, the upper housing portion 41 and the lower housing portion 42 are mounted with a vehicle body.

Next, a lubricant is applied to the internal surfaces of the upper housing portion 41 and the lower housing portion 42 of the housing 40, the lower housing portion 42 having the lubricant applied thereto is closely attached to the lower portion of the bearing 30, the upper housing portion 41 having the lubricant applied thereto is closely attached to the upper portion of the bearing 30, and the vehicle body-mounting terminals 47 of the upper housing portion 41 and the lower housing portion 42 are mounted with a predetermined position of the vehicle body by bolting.

Thereafter, as described above with reference to FIG. 2A, FIG. 2B, FIG. 3A, FIG. 3B, FIG. 4A, FIG. 4B, FIG. 5A and FIG. 5B, the seals 50 are independently mounted in the first seal mounting terminals 33 of the bearing 30 or the second seal mounting terminals 43 of the housing 40, or are independently pressed into spaces between the first seal mounting terminals 33 and the second seal mounting terminals 43, thus being configured for sealing the sliding contact surface between the bearing 30 and the housing 40 to block the inflow of foreign substances. Accordingly, assembly of the bush according to various exemplary embodiments of the present invention is completed.

FIG. 7A, FIG. 7B, FIG. 7C, and FIG. 7D are views exemplarily illustrating a method for assembling a bush for vehicles according to various exemplary embodiments of the present invention.

As shown in FIG. 7A, FIG. 7B, FIG. 7C, and FIG. 7D, to easily assemble the bush according to various exemplary embodiments of the present invention with the internal structure 10, a first bearing portion 31 and a second bearing portion 32 having a semicircular cross-section configured to form a bearing 30 are separately manufactured, and an upper housing portion 41 and a lower housing portion 42 configured to form a housing 40 are separately manufactured.

That is to say, the bearing 30 includes the first bearing portion 31 and the second bearing portion 32 which are closely coupled to each other to form a spherical cross-section together with an elastic body 20, and the housing 40 includes the upper housing portion 41 and the lower housing portion 42 which are coupled to each other to surround the first bearing portion 31 and the second bearing portion 32.

Here, as shown in FIG. 9, position regulatory pins 36 and position regulatory recesses 37 are respectively formed on and in the surfaces of the first bearing portion 31 and the second bearing portion 32 which are closely attached to each other, and primary coupling between the first bearing portion 31 and the second bearing portion 32 prior to assembly of the housing 40 therewith may be realized by coupling between the position regulatory pins 36 and the position regulatory recesses 37.

Furthermore, the elastic body 20 may include a first elastic body portion 21 and a second elastic body portion 22 which are respectively formed integrally with the internal surfaces of the first bearing portion 31 and the second bearing portion 32 by injection molding, or the first elastic body portion 21 and the second elastic body portion 22 may be separately manufactured, be temporarily assembled with the internal surfaces of the first bearing portion 31 and the second bearing portion 32 through interference fitting, and then be attached to each other using an adhesive.

Thereafter, a pair of seals 50 is inserted into the internal structure 10, i.e., a stabilizer bar, to be spaced from each other.

Next, the first elastic body portion 21 and the second elastic body portion 22 are closely attached to the external circumferential surface of the internal structure 10, and accordingly, the first bearing portion 31 and the second bearing portion 32 together with the first and second elastic body parts 21 and 22 form a spherical cross-section.

Subsequently, after the external surfaces of the first bearing portion 31 and the second bearing portion 32 are pressed by holding jigs 70, the seals 50 configured to seal the sliding contact surface between the bearing 30 and the housing 40 are mounted in the first seal mounting terminals 33 of the bearing 30 prior to assembly of the housing 40 with the bearing 30, as shown in FIGS. 2A and 2B.

Thereafter, after the holding jigs 70 are removed, the upper housing portion 41 and the lower housing portion 42 are closely attached to the external surfaces of the first bearing portion 31 and the second bearing portion 32, and the upper housing portion 41 and the lower housing portion 42, closely attached to the external surfaces of the first bearing portion 31 and the second bearing portion 32, are assembled with a predetermined position of a vehicle body 100 through vehicle body-mounting terminals 47. Accordingly, assembly of the bush according to various exemplary embodiments of the present invention is completed.

Here, after assembly of the upper and lower housing portions 42 to the vehicle body is completed, first ribs 53 of the seals 50, each first rub 53 including an external rib 53-1 and an internal rib 53-2 are closely attached to second seal mounting terminals 43 of the housing 40, second ribs 54 of the seals 50 are closely attached to the external surface of the elastic body 20, as shown in FIGS. 2A and 2B, and accordingly, the sliding contact surface between the bearing 30 and the housing 40 is sealed to block the inflow of foreign substances thereinto.

In the above-described methods for assembling the bush according to an exemplary embodiment and another exemplary embodiment of the present invention, when the first elastic body portion 21 and the second elastic body portion 22 are attached to the internal surfaces of the first bearing portion 31 and the second bearing portion 32 using an adhesive, a process of curing the adhesive may be further performed to ensure adhesive strength.

After the above-described methods for assembling the bush according to an exemplary embodiment and another exemplary embodiment of the present invention have been completed, if the parting lines between the upper housing portion 41 and the lower housing portion 42 overlap the parting lines between the first bearing portion 31 and the second bearing portion 32, contact between the parting lines may cause trapping and damage when the bearing 30 and the housing 40 come into sliding contact with each other.

To solve the present problem, by arranging the upper housing portion 41 and the lower housing portion 42 such that the parting lines between the upper housing portion 41 and the lower housing portion 42 are spaced from the parting lines between the first bearing portion 31 and the second bearing portion 32 by a designated angle $\theta$ in a circumferential direction when the upper housing portion 41 and the lower housing portion 42 are closely attached to the first bearing portion 31 and the second bearing portion 32, when the bearing 30 and the housing 40 come into sliding contact with each other, contact between the respective parting lines may be avoided.

In the above-described methods for assembling the bush according to an exemplary embodiment and another exemplary embodiment of the present invention, the elastic body 20 manufactured in a one-piece structure rather than the above-described two-piece structure, in which the elastic body 20 is separated into the first elastic body portion 21 and the second elastic body portion 22, may be applied.

Figure 16:
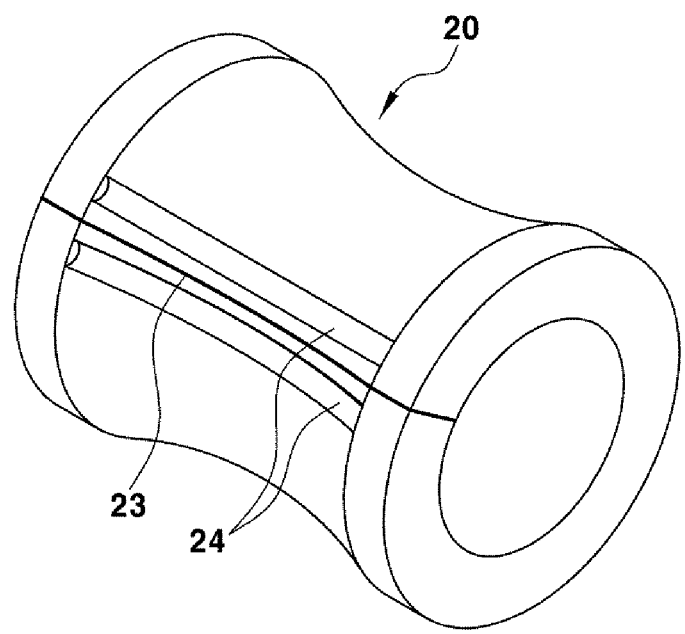
FIG. 16 is a perspective view exemplarily illustrating one example of an elastic body manufactured to have a one-piece structure in the bush for vehicles according to various exemplary embodiments of the present invention.

Referring to FIG. 16, the elastic body 20 may be manufactured in a one-piece structure having a circular annular cross-section attached to the internal surfaces of the first bearing portion 31 and the second bearing portion 32 and having one parting line 23.

When the elastic body 20 is manufactured in a one-piece structure having one parting line 23, coupling grooves 24 for position regulation and coupling with the bearing 30, including the first bearing portion 31 and the second bearing portion 32, may be formed in the external surface of the elastic body 20.

Furthermore, coupling protrusions 38 inserted into the coupling grooves 24 of the elastic body 24 may be formed on the internal surfaces of the first bearing portion 31 and the second bearing portion 32 of the bearing 30.

Figure 17:
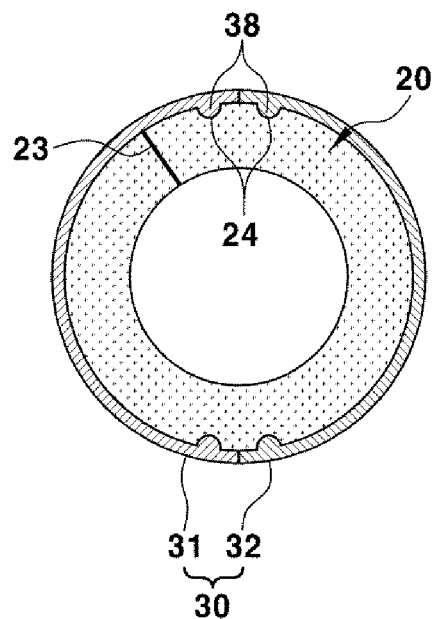
FIG. 17 is a longitudinal-sectional view exemplarily illustrating the state in which the elastic body shown in FIG. 16 is coupled to the bearing.

Therefore, as shown in FIG. 17, temporary assembly of the elastic body 20 with the bearing 30 and regulation of the position of the elastic body 20 may be realized by inserting the coupling protrusions 38 into the coupling grooves 24.

Furthermore, by manufacturing the elastic body 20 in a one-piece structure, when the elastic body 20 is attached to the bearing 30, the adhesive may be applied at one time, and thus, labor for assembly may be reduced and adhesive force of the elastic body 20 to the bearing 30 may be improved.

Figure 12:
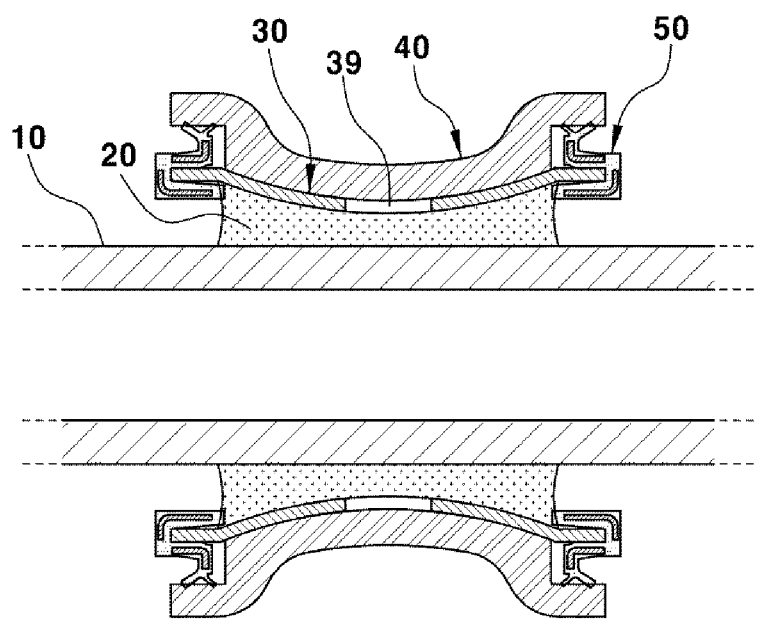
FIG. 12 is a cross-sectional view exemplarily illustrating formation of a lubricant storage hole in the bearing of the bush for vehicles according to various exemplary embodiments of the present invention.

Furthermore, in the configuration of the bush according to various exemplary embodiments of the present invention manufactured in the above-described structure, a lubricant storage hole 39 or a lubricant storage groove may be additionally formed at a predetermined position of the bearing 30, as shown in FIG. 12, being configured for continuously ensuring smooth sliding contact between the bearing 30 and the housing 40.

Figure 13:
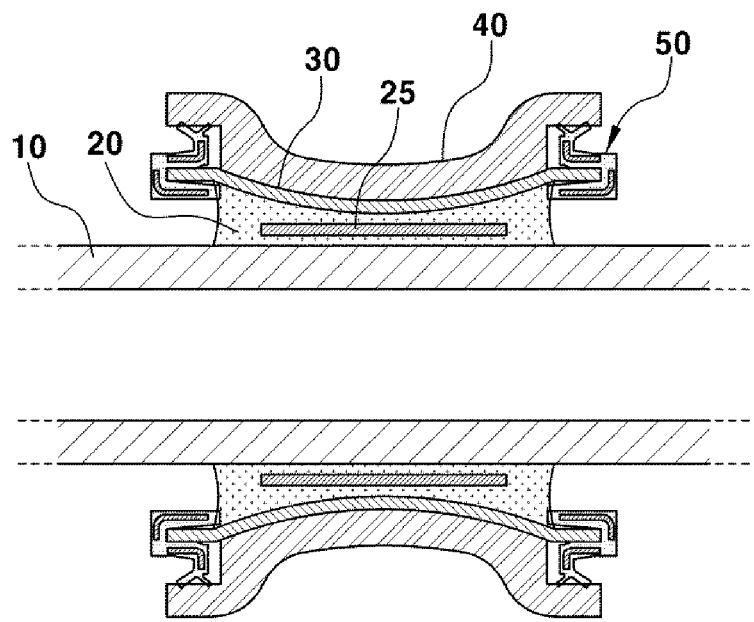
FIG. 13 is a cross-sectional view exemplarily illustrating insertion of an intermediate iron pipe into the elastic body of the bush for vehicles according to various exemplary embodiments of the present invention.

Furthermore, in the configuration of the bush according to various exemplary embodiments of the present invention manufactured in the above-described structure, when the elastic body 20 is manufactured, an intermediate iron pipe 25 may be inserted into the elastic body 20, as shown in FIG. 13, being configured for reinforcing stiffness of the elastic body 20.

Like this, if the bush according to various exemplary embodiments of the present invention is mounted on a stabilizer bar among internal structures of a vehicle, the elastic body 20 absorbs displacement due to the rotation and the conical motion of the stabilizer bar and simultaneously, sliding contact between the bearing 30 and the housing 40 is executed, facilitating an internal structure, i.e., the stabilizer bar, to reliably perform operations of the internal structure for controlling the behavior of the vehicle body and absorbing vibration, i.e., improving ride comfort of the vehicle due to reduction in hysteresis in the behavior of the stabilizer bar and reduction in delay of the behavior of wheels upon bumping and rebounding.

As is apparent from the above description, a bush for vehicles and a method for assembling the same according to various exemplary embodiments of the present invention provide the following effects.

First, an elastic body absorbs displacement due to the rotation and the conical motion of a stabilizer bar and simultaneously, sliding contact between a bearing and a housing is executed, facilitating an internal structure, such as the stabilizer bar, to reliably perform operations of the internal structure for controlling the behavior of a vehicle body and absorbing vibration, i.e., improving ride comfort of the vehicle due to reduction in hysteresis in the behavior of the stabilizer bar and reduction in delay of the behavior of wheels upon bumping and rebounding.

Second, freedom in determination of the mounting positions of seals of the bush is provided, and simultaneously, the capability of the seals to completely seal a sliding contact portion of the bearing may be secured.

Third, since the seals are mounted between extensions of both end portions of the bearing and the housing, in which sliding contact with therebetween does not occur, the mounted state of the seals may be securely maintained even when relative sliding contact between the bearing and the housing occurs.

Fourth, when relative sliding contact between the bearing and the housing occurs, the seals are relatively rotated with the bearing or the housing between the extensions of both end portions of the bearing and the extensions of both end portions of the housing, being configured for preventing detachment of the seals and securing durability of the seals while maintaining the sealing function of the seals.

Fifth, the bush according to various exemplary embodiments of the present invention may be less expensive and more lightweight than the conventional bush which is expensive and has complicated ball bearings mounted therein.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A bush comprising:
   an elastic body configured to be attached to an external surface of an internal structure;
   a bearing, wherein the elastic body is coupled to an internal surface of the bearing;
   a housing coupled to an external surface of the bearing to come into sliding contact with the bearing; and
   seals mounted on at least one of a first end portion and a second end portion of the bearing and a first end portion and a second end portion of the housing to seal a sliding contact surface between the bearing and the housing,
   wherein one or more ribs is formed to protrude from the internal surface of the bearing in a circumferential direction, a longitudinal direction and a diagonal direction of the bearing to reinforce stiffness of the bearing, to guide the elastic body interference-fitted into the bearing and to regulate a position of the elastic body.

2. The bush of claim 1, wherein a first restraint terminal is formed at a longitudinal center or each of the first end portion and the second end portion of the bearing, and a second restraint terminal attached to the first restraint terminal is formed at a longitudinal center or each of the first end portion and the second end portion of the housing, to restrain a longitudinal relative motion between the bearing and the housing.

3. The bush of claim 2, wherein the first restraint terminal and the second restraint terminal have a same cross-sectional shape which is formed to be concave in an inward direction thereof, formed to be convex in an outward direction thereof, or formed to have one or more uneven surfaces or tapered surfaces.

4. The bush of claim 1, wherein the elastic body is formed integrally with the internal surface of the bearing by injection molding, or is assembled with the internal surface of the bearing through interference fitting, or is for a predetermined time assembled with the internal surface of the bearing through interference fitting and is then attached thereto using an adhesive.

5. The bush of claim 1, wherein, the elastic body is manufactured by molding and an insert of reinforcing stiffness of the elastic body is placed in the elastic body.

6. The bush of claim 1, wherein a lubricant storage hole or a lubricant storage groove is formed at a predetermined position of the bearing.

7. The bush of claim 1, wherein first seal mounting terminals are formed to extend from the first end portion and the second end portion of the bearing, and second seal mounting terminals are formed to extend from the first end portion and the second end portion of the housing, to mount the seals therein.

8. The bush of claim 7, wherein the seals include:
a body portion, wherein the first seal mounting terminals of the bearing are pressed into an internal surface of the body portion;
a first rib including an external rib and an internal rib extending from an internal end portion of an external diameter of the body portion and spreading at a designated angle therebetween to be attached to the second seal mounting terminals; and
a second rib extending from an internal end portion of an internal diameter of the body portion in a horizontal direction to be attached to an external surface of the elastic body.

9. The bush of claim 7, wherein the seals include:
a body portion, wherein the second seal mounting terminals of the housing are pressed into an internal surface of the body portion; and
a single rib including a subsidiary rib extending from an internal end portion of an internal diameter of the body portion to be attached to the first seal mounting terminals of the bearing.

10. The bush of claim 7, wherein the seals include:
a body portion, wherein the first seal mounting terminals of the bearing are pressed into an internal surface of the body portion; and
a single rib including a subsidiary rib extending from an internal end portion of an external diameter of the body portion to be attached to the second seal mounting terminals of the housing.

11. The bush of claim 7, wherein the seals include:
a first body portion having a C-shaped cross section and including a contact rib to be pressed into a space between the first seal mounting terminals of the bearing and the second seal mounting terminals of the housing; and
a second body portion having an L-shaped cross-section and including a coupling rib formed on an internal surface thereof so that the first body portion is pressed into the coupling rib.

12. The bush of claim 7, wherein a groove is formed in the first seal mounting terminals of the bearing or the second seal mounting terminals of the housing, and a snap ring configured to restrain an external surface of the seals is mounted in the groove to prevent detachment of the seals.

13. The bush of claim 7, wherein a position regulatory stopper protrudes from a predetermined position of the seals, and a position regulatory recess, into which the position regulatory stopper is inserted, is formed in the first seal mounting terminals of the bearing or the second seal mounting terminals of the housing.

14. The bush of claim 1,
wherein the bearing includes a first bearing portion and a second bearing portion, configured to be coupled to each other to form a spherical cross-section with the elastic body,
wherein the housing includes an upper housing portion and a lower housing portion, configured to be coupled to each other to surround the first bearing portion and the second bearing portion, and
wherein position regulatory pins and position regulatory recesses are formed on and in the first bearing portion and the second bearing portion to assemble the first bearing portion and the second bearing portion with each other.

15. The bush of claim 14, wherein parting lines between the first bearing portion and the second bearing portion are spaced from parting lines between the upper housing portion and the lower housing portion by a predetermined angle.

16. The bush of claim 15, wherein the elastic body includes a first elastic body portion and a second elastic body portion to be formed integrally with internal surfaces of the first bearing portion and the second bearing portion, respectively, by injection molding, or to be separately attached to or pressed into the internal surfaces of the first bearing portion and the second bearing portion, or is manufactured in a one-piece structure having one parting line and attached to or pressed into the internal surfaces of the first bearing portion and the second bearing portion.

17. The bush of claim 14, wherein a lubricant injection hole is formed in an external surface of the upper housing portion and the lower housing portion, or lubricant storage grooves are formed in internal surfaces of the upper housing portion and the lower housing portion, which contact with the bearing, and mounting terminals are formed at the upper housing portion and the lower housing portion.

18. A method for assembling a bush, the method comprising:
separately manufacturing a first bearing portion and a second bearing portion to be assembled with each other to form a bearing;
separately manufacturing an upper housing portion and a lower housing portion to be assembled with each other to form a housing;
forming a first elastic body portion and a second elastic body portion integrally with internal surfaces of the first bearing portion and the second bearing portion by injection molding or attaching the first elastic body portion and the second elastic body portion to the internal surfaces of the first bearing portion and the second bearing portion using an adhesive;
inserting a pair of seals into an internal structure to be spaced from each other;
attaching the first elastic body portion and the second elastic body portion to an external surface of the internal structure;
coupling the upper housing portion and the lower housing portion to external surfaces of the first bearing portion and the second bearing portion, and assembling the upper housing portion and the lower housing portion, coupled to the external surfaces of the first bearing portion and the second bearing portion, with a vehicle body;
mounting the seals between a first end portion and a second end portion of the bearing and a first end portion and a second end portion of the housing to seal a sliding contact surface between the bearing and the housing; and
independently mounting the seals in first seal mounting terminals of the bearing or second seal mounting terminals of the housing or by independently pressing the seals into spaces between the first seal mounting terminals and the second seal mounting terminals to seal the sliding contact surface between the bearing and the housing,
wherein, in the coupling the upper housing portion and the lower housing portion to the external surfaces of the first bearing portion and the second bearing portion, parting lines between the upper housing portion and the lower housing portion are spaced from parting lines between the first bearing portion and the second bearing portion by a predetermined angle.

19. A method for assembling a bush, the method comprising:
- separately manufacturing a first bearing portion and a second bearing portion to be assembled with each other to form a bearing;
- separately manufacturing an upper housing portion and a lower housing portion to be assembled with each other to form a housing;
- forming a first elastic body portion and a second elastic body portion integrally with internal surfaces of the first bearing portion and the second bearing portion by injection molding or attaching the first elastic body portion and the second elastic body portion to the internal surfaces of the first bearing portion and the second bearing portion using an adhesive;
- inserting a pair of seals into an internal structure to be spaced from each other;
- attaching the first elastic body portion and the second elastic body portion to an external circumferential surface of the internal structure;
- pressing external surfaces of the first bearing portion and the second bearing portion by holding jigs, and mounting the seals to seal a sliding contact surface between the bearing and the housing in first seal mounting terminals of the bearing; and
- removing the holding jigs, attaching the upper housing portion and the lower housing portion to external surfaces of the first bearing portion and the second bearing portion, and then assembling the upper housing portion and the lower housing portion, attached to the external surfaces of the first bearing portion and the second bearing portion, with a vehicle body,
- wherein, in the coupling the upper housing portion and the lower housing portion to the external surfaces of the first bearing portion and the second bearing portion, parting lines between the upper housing portion and the lower housing portion are spaced from parting lines between the first bearing portion and the second bearing portion by a predetermined angle.

* * * * *